UNITED STATES PATENT OFFICE.

FRANK H. WYETH, OF PHILADELPHIA, PENNSYLVANIA.

RUBEFACIENT MEDICAL REMEDY.

SPECIFICATION forming part of Letters Patent No. 350,405, dated October 5, 1886.

Application filed March 25, 1886. Serial No. 196,600. (No specimens.)

*To all whom it may concern:*

Be it known that I, FRANK H. WYETH, a citizen of the United States, residing at Philadelphia, in the county of Philadelphia and State of Pennsylvania, have invented certain new and useful Improvements in Medicinal and Pharmaceutical Preparations; and I do hereby declare the following to be a full, clear, and exact description of the invention, such as will enable others skilled in the art to which it appertains to make and use the same.

This invention relates to medicinal preparations.

The object is to produce a preparation capable of topical or external application, which shall be powerfully efficacious in the relief of pain by acting as an efficient rubefacient, counter-irritant, nervous stimulant, and anodyne, and which shall at the same time be in a most ready and convenient form for exhibition by being presented in solid form in the nature of a tangible and firm liniment.

It has long been desired to produce an external application powerful and persistent as a counter-irritant, which will still not cause the distress from blistering and ulceration which attends the action of mustard plasters, blisters, and severe liniments.

The invention consists in a composition containing paraffine and capsicum, with which may be combined menthol and other agents, forming a rubefacient remedy.

The remedy is in the nature and has the effect of a sinapism long applied and of gradual operation, but possesses the advantage that it will not produce eruption upon the skin.

Though the remedy is not a vesicant, it acts potently in those situations where blisters are frequently applied—namely, behind the ears, to the temples, upon the thorax, or to the lumbar region, and even to the lower extremity—that is, to the calves of the legs or the feet—to produce powerful and immediate revulsion in case of pressure upon the brain or congestion in the thoracic regions.

The remedial properties of menthol are too well established to require attestation, and the topical mode of use of the same is well known; but though menthol when properly exhibited doubtless acts to relieve pain, its *modus operandi* being probably in part rubefacient and in part anti-spasmodic by direct absorption, yet, owing to its extreme volatility, its rubefacient and counter-irritant effects are not sufficiently lasting. As an adjunct, therefore, to menthol, or to preparations containing the same, I add capsicum in any of its preparations, and it is found that by this addition the most markedly enhanced beneficial results are achieved.

By combination with menthol and a suitable excipient of a suitable quantity of capsicum a preparation is produced which is distinctive of itself, and which, when applied to the skin, has increased effects over menthol alone, acts as an efficient rubefacient and powerful anti-spasmodic or nervous stimulant and anodyne, and acts in an astonishing manner as to the multitude and variety of cases and in the almost immediate alleviation of pain. Thus the composition of capsicum with menthol and a suitable excipient—say paraffine—has been successfully applied to the alleviation of pain in dysmenorrhea, sciatica, neuralgia generally, rheumatism, headache, colic, chorea, and many other nervous, arterial, blood, spasmodic, local, or general affections, by application topically to the seat of pain or to the region of the spinal column.

Equally convenient and useful is the remedy in the treatment of internal and inflammatory affections—such as nausea, vomiting, meningitis, pleuritis, peritonitis, enlargement of the liver and spleen, swollen glands, tonsilitis, laryngitis, swollen and inflamed joints, &c., wherever and whenever a counter-irritant is required. The remedy specially called "anodyne" is indicated when the case is one of superficial pain, like lumbago, weak and tender back, neuralgia, &c.

To the composition of capsicum and paraffine with or without menthol and with any excipient replacing paraffine may be added morphia and chloral, or either of them, in the case of addition of chloral to menthol care being taken that in liquefaction of the menthol and chloral resulting from their admixture may be covered by the excipient or otherwise suitably met. The addition of these ingredients, or of either of them, modifies the action of the composition and induces an anodyne effect. When the narcotic, hypnotic, or anodyne is added, the composition may truly be termed a "rubefacient anodyne," and in the form in which it is presented a "rubefacient anodyne cone" or "crystallized liniment."

As an example of a composition that may be produced by the mixture of menthol, capsicum, and an excipient, I will give the following: To make one pound of my improved preparation for the alleviation of pain and for topical application, take of melted paraffine ten ounces, of menthol five ounces, and of oleoresin of capsicum or capsicin eight drams, and mix the same thoroughly, forming a homogeneous mass in the nature of a cerate. When so compounded, the mass is divided into portions of suitable shape and size for use. I prefer to mold it into conical form and present it with a capped handle or holder, which forms the subject-matter of another application filed of even date herewith.

It is obvious that the proportions of ingredients named may be varied; that instead of oil of capsicum any other suitable preparation of capsicum may be employed; that any substance containing menthol may take the place of pure menthol, and that instead of paraffine spermaceti cacao butter or wax may be employed; but I prefer to employ paraffine, and to secure the best effect the ingredients should be pure.

The preparation as exhibited is in the nature of a solidified liniment, and has the effect when applied of a cataplasm.

The remedy can be applied under any circumstances, on railway journeys, at sea, at home, or abroad. It is only necessary to rub the cone upon or over the part—the seat of pain—a few times, until a gentle tingling is felt. After this the action can be readily maintained by more or less frequent applications, according to the effect desired. No danger to the skin need be apprehended.

As the remedy is put up in compact form, it can easily be carried about in the pocket, and is always ready for immediate use.

Having thus fully described my invention, what I claim, and desire to secure by Letters Patent, is—

1. A solid mass or conical stick containing capsicum and paraffine, substantially as described.

2. A composition containing capsicum, a suitable excipient, and menthol, as and for the purposes set forth.

In testimony whereof I affix my signature in presence of two witnesses.

FRANK H. WYETH.

Witnesses:
R. G. DYRENFORTH,
G. N. MORISON, Jr.